United States Patent
Shi

(10) Patent No.: US 12,348,439 B2
(45) Date of Patent: Jul. 1, 2025

(54) METHOD FOR DATA TRANSMISSION AND TERMINAL DEVICE

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 364 days.

(21) Appl. No.: 17/369,604

(22) Filed: Jul. 7, 2021

(65) Prior Publication Data

US 2021/0336732 A1   Oct. 28, 2021

Related U.S. Application Data

(63) Continuation of application No. PCT/CN2019/072053, filed on Jan. 16, 2019.

(51) Int. Cl.
*H04L 5/00* (2006.01)

(52) U.S. Cl.
CPC .................. *H04L 5/0044* (2013.01)

(58) Field of Classification Search
None
See application file for complete search history.

(56) References Cited

U.S. PATENT DOCUMENTS

| | | | | |
|---|---|---|---|---|
| 11,706,611 B2* | 7/2023 | Xiao | ..................... | H04W 72/51 370/329 |
| 2018/0376457 A1 | 12/2018 | Tseng et al. | | |
| 2019/0098544 A1* | 3/2019 | Han | ................. | H04W 36/0044 |
| 2019/0215717 A1* | 7/2019 | Lee | ........................ | H04W 72/21 |
| 2019/0215719 A1* | 7/2019 | Wei | ........................ | H04L 1/00 |
| 2019/0239279 A1* | 8/2019 | Shi | ........................ | H04W 80/02 |
| 2019/0253924 A1* | 8/2019 | Kim | ........................ | H04W 28/0273 |
| 2019/0253926 A1* | 8/2019 | Kim | ......................... | H04L 1/08 |
| 2019/0387535 A1* | 12/2019 | Kim | ................. | H04W 56/0045 |
| 2020/0029379 A1* | 1/2020 | Xiao | ........................ | H04L 1/22 |
| 2020/0187297 A1 | 6/2020 | Jiang | | |
| 2020/0236734 A1* | 7/2020 | Wei | ........................ | H04W 80/02 |
| 2020/0314690 A1* | 10/2020 | Kim | ........................ | H04W 4/70 |
| 2020/0404743 A1* | 12/2020 | Baek | ..................... | H04W 76/27 |
| 2021/0144583 A1* | 5/2021 | Xiao | ........................ | H04L 1/08 |

(Continued)

FOREIGN PATENT DOCUMENTS

| | | |
|---|---|---|
| CN | 108370304 | 8/2018 |
| CN | 108401484 | 8/2018 |

(Continued)

OTHER PUBLICATIONS

Huawei, "PDCP Duplication with More than two RLC Channels." 3GPP TSG-RAN WG2#104, Spokane, USA, Nov. 12-16, 2018, R2-1817510.*

(Continued)

*Primary Examiner* — Andrew C Oh
(74) *Attorney, Agent, or Firm* — Hodgson Russ LLP

(57) ABSTRACT

A method for data transmission and a terminal device are provided. The method includes the following. The terminal device determines to change an RLC entity for transmitting a PDCP PDU, and determines a target RLC entity for transmitting the PDCP PDU and/or a target carrier used by a logical channel of the target RLC entity.

12 Claims, 6 Drawing Sheets

(56) References Cited

U.S. PATENT DOCUMENTS

| | | | |
|---|---|---|---|
| 2021/0219375 A1* | 7/2021 | Kim | H04W 76/27 |
| 2021/0242974 A1* | 8/2021 | Fujishiro | H04W 72/04 |
| 2022/0078661 A1* | 3/2022 | Wang | H04L 1/1841 |
| 2023/0007531 A1* | 1/2023 | Xiao | H04W 28/06 |

FOREIGN PATENT DOCUMENTS

| | | | | |
|---|---|---|---|---|
| CN | 108810990 | | 11/2018 | |
| CN | 109391951 A | * | 2/2019 | H04L 5/0053 |
| CN | 110300428 A | * | 10/2019 | |
| CN | 107257551 B | * | 5/2021 | H04L 5/0032 |
| EP | 3731584 A1 | * | 10/2020 | H04B 7/088 |
| EP | 3737154 A1 | * | 11/2020 | H04L 1/1864 |
| EP | 3893547 A1 | * | 10/2021 | H04L 5/0044 |
| EP | 4114112 A1 | * | 1/2023 | H04L 1/0026 |
| WO | WO-2014181384 A1 | * | 11/2014 | H04W 76/15 |
| WO | WO-2015165418 A1 | * | 11/2015 | H04L 43/0829 |
| WO | WO-2015184889 A1 | * | 12/2015 | H04L 5/0055 |
| WO | WO-2017121347 A1 | * | 7/2017 | D06F 39/02 |
| WO | WO-2018028391 A1 | * | 2/2018 | H04L 1/08 |
| WO | 2018143600 | | 8/2018 | |
| WO | 2018221926 | | 12/2018 | |
| WO | WO-2019036862 A1 | * | 2/2019 | H04L 1/0006 |
| WO | WO-2019064204 A1 | * | 4/2019 | G06F 9/45558 |
| WO | WO-2019139349 A1 | * | 7/2019 | H04B 7/088 |
| WO | WO-2020060234 A1 | * | 3/2020 | H04L 1/1614 |
| WO | WO-2021010455 A1 | * | 1/2021 | |
| WO | WO-2021010463 A1 | * | 1/2021 | H04W 36/0061 |
| WO | WO-2021127943 A1 | * | 7/2021 | H04L 5/0098 |

OTHER PUBLICATIONS

Rapporteur (Nokia) et al., "Logical channel restrictions clarifications and correction," 3GPP TSG-RAN WG2 Meeting #104, R2-1816419, Nov. 2018, 3 pages.
WIPO, International Search Report for PCT/CN2019/072053, Oct. 15, 2019.
EPO, Communication for EP Application No. 19910738.4, Aug. 10, 2022.
EPO, Extended European Search Report for EP Application No. 19910738.4, Nov. 25, 2021.
Vivo, 3GPP TSG-RAN WG2, Meeting #101, R2-1801988, "Remaining Issues of PDCP Duplication", 10.3.3.5, Feb. 2018.
CATT, GPP TSG-RAN WG2, Meeting #101bis, R2-1804487, "Leftover Issues on Duplication", 10.3.1.11, Feb. 2018.
CATT, 3GPP TSG-RAN WG2, #NR Ad hoc 0118, R2-1800171, "PDCP Operation and Configuration for Duplication", 10.3.3.5, Jan. 2018.
3rd Generation Partnership Project, "Technical Specification Group Radio Access Network; Evolved Universal Terrestrial Radio Access (E-UTRA);Radio Link Control (RLC) protocol specification (Release 17)," 3GPP TS 36.322, Mar. 2022, V17.0.0.
CNIPA, First Office Action for CN Application No. 202111601942.1, Apr. 5, 2023.
EPO, Communication for EP Application No. 19910738.4, Jan. 17, 2023.
CNIPA, First Office Action for CN Application No. 202111601942.1, Jan. 10, 2023.
EPO, Communication for EP Application No. 19910738.4, Jul. 7, 2023.
EPO, Extended European Search Report for EP Application No. 24170205.9, Jun. 24, 2024.

* cited by examiner

METHOD FOR DATA TRANSMISSION AND TERMINAL DEVICE

CROSS-REFERENCE TO RELATED APPLICATION(S)

This application is a continuation of International Application No. PCT/CN2019/072053, filed on Jan. 16, 2019, the entire disclosure of which is incorporated herein by reference.

TECHNICAL FIELD

Implementations of the present disclosure relates to the field of communications, and in particular, to a method for data transmission and a terminal device.

BACKGROUND

In a new radio (NR) system, a data duplication function of a packet data convergence protocol (PDCP) can be used to transmit duplicated data, so as to improve reliability of data transmission. For example, a PDCP layer first performs data duplication to obtain two PDCP protocol data units (PDUs), and maps the two PDCP PDUs to different radio link control (RLC) entities. Further, the RLC entity can carry the PDCP PDU through a corresponding logical channel, where the logical channel is configured with a corresponding available carrier set.

In order to improve transmission reliability, different logical channels are usually configured with different carriers. In this way, when the number of the logical channels increases, there will be a problem of insufficient carriers. In addition, when a network device deactivates a duplicated-data transmission function of a radio bearer, how to use a carrier to transmit non-duplicated data to improve data transmission performance is a problem to be solved.

SUMMARY

Implementations of the present disclosure provide a method for data transmission, a terminal device, and a non-transitory computer-readable storage medium.

In a first aspect, a method for data transmission is provided. The method includes determining, by a terminal device, a target RLC entity for transmitting a PDCP PDU and/or a target carrier used by a logical channel of the target RLC entity, in response to determining to change an RLC entity for transmitting the PDCP PDU.

In a second aspect, a terminal device is provided. The terminal device includes a processor and a memory storing a computer program which, when executed by the processor, causes the processor to determine to change an RLC entity for transmitting a PDCP PDU, and determine a target RLC entity for transmitting the PDCP PDU and/or a target carrier used by a logical channel of the target RLC entity.

In a third aspect, a non-transitory computer-readable storage medium is provided. The storage medium stores a computer program which, when executed by a processor, causes the processor to determine to change an RLC entity for transmitting a PDCP PDU, and determine a target RLC entity for transmitting the PDCP PDU and/or a target carrier used by a logical channel of the target RLC entity.

DETAILED DESCRIPTION

The technical solutions in implementations of the present disclosure will be described in the following with reference to the accompanying drawings in the implementations of the present disclosure. Apparently, the described implementations are merely a part of rather than all the implementations of the present disclosure. All other implementations obtained by those of ordinary skill in the art based on the implementations of the present disclosure without creative efforts are within the scope of the present disclosure.

The technical solutions in the implementations of the present disclosure can be applied to various communication systems, such as a global system of mobile communication (GSM), a code division multiple access (CDMA) system, a wideband code division multiple access (WCDMA) system, general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a fifth generation (5G) system, or the like.

Figure 1:
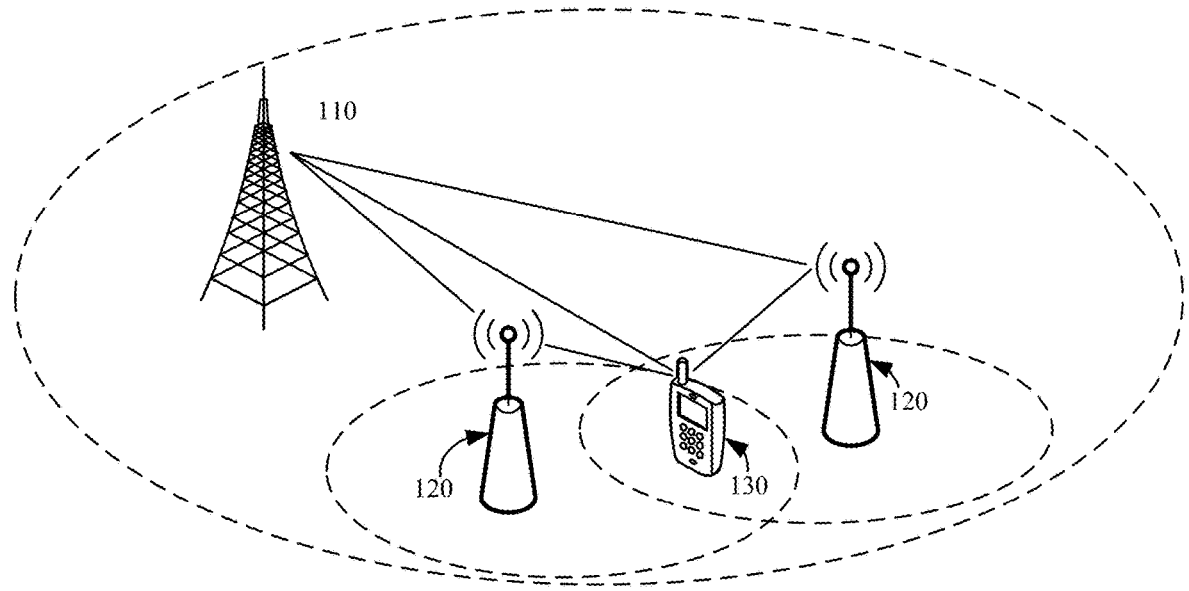
FIG. 1 is a schematic diagram illustrating a communication system architecture according to an implementation of the present disclosure.

FIG. 1 illustrates an application scenario according to an implementation of the present disclosure. Network devices around a terminal device 130 in FIG. 1 include a master network device 110 and at least one secondary network device 120. Each secondary network device 120 is connected with the master network device 110 to establish dual connection (DC), and is connected with the terminal device 130 to serve the terminal device 130.

The terminal device 130 can be connected to both the master network device 110 and the secondary network device 120. A connection established between the terminal device 130 and the master network device 110 is a master connection, and a connection established between the terminal device 130 and the secondary network device 120 is a secondary connection. Control signaling from the terminal device 130 can be transmitted via the master connection, and data from the terminal device 130 can be transmitted via both the master connection and the secondary connection, or can be transmitted only via the secondary connection.

In an implementation, the master network device 110 may be an LTE network device, and the secondary network device 120 may be an NR network device. In another implementation, the master network device 110 may be an NR network device, and the secondary network device 120 may be an LTE network device. In yet another implementation, both the master network device 110 and the secondary network device 120 are NR network devices. However, in the implementations of the present disclosure, there is no limitation on application scenarios of the technical solutions.

For example, the master network device 110 may be a GSM network device, a CDMA network device or the like, and the secondary network device 120 may also be a GSM network device, a CDMA network device, or the like.

For another example, the master network device 110 may be a macrocell, and the secondary network device 120 may be a microcell, a picocell, or a femtocell.

In a carrier aggregation (CA) scenario, a packet data convergence protocol (PDCP) can support a data duplication function, that is, by using the data duplication function of the PDCP, duplicated data can be enabled to correspond to two or more bearers, and ultimately it can be ensured that multiple duplicated and identical PDCP protocol data units (PDUs) can be transmitted on different physical layer aggregation carriers, so as to achieve a frequency diversity gain to improve reliability of data transmission.

The "terminal device" used herein may include but is not limited to a device coupled via a wired line, and/or other data connection/network, and/or a wireless interface, and/or a device communicating with another terminal device to receive/transmit communication signals, and/or an Internet of Things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a WLAN, a digital television network (such as a digital video broadcasting-handheld (DVB-H) network), a satellite network, and an amplitude modulation-frequency modulation (AM-FM) broadcast transmitter. A terminal device configured to communicate via the wireless interface may be called a "wireless communication terminal", a "wireless terminal", or a "mobile terminal". Examples of a mobile terminal may include, but are not limited to, a satellite or cellular telephone, a personal communication system (PCS) terminal integrated with functions of cellular radio telephone, data processing, fax, and data communication, a personal digital assistant (PDA) equipped with radio telephone, pager, Internet/Intranet access, web browsing, a notebook, a calendar, and/or a global positioning system (GPS) receiver, and a conventional laptop and/or a handheld receiver or other electronic devices equipped with a radio telephone transceiver. The terminal device may refer to an access terminal, user equipment (UE), a user unit, a user station, a mobile station, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a PDA, a handheld device with a wireless communication function, a computing device or other processing devices coupled with a wireless modem, a vehicle-mounted device, a wearable device, a terminal device in the 5G network or the future evolution PLMN, or the like.

In an implementation, the communication system 100 may further include a network controller, a mobility management entity (MME), or other network entities, which is not limited herein.

It is to be understood that the terms "system" and "network" are often used interchangeably in the specification. The term "and/or" in the specification is only for describing an association relationship of associated objects, which means that there may be three relationships, for example, A and/or B, which may mean that: A exists alone, A and B both exist, and B exists alone. In addition, the character "/" in the specification generally means that an object before "/" and an object after "/" are in an "or" relationship.

Figure 2:
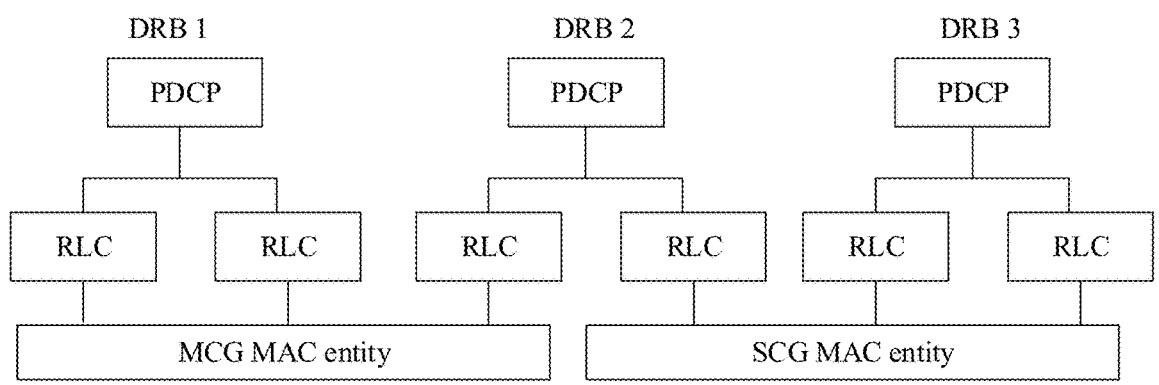
FIG. 2 is a schematic block diagram illustrating a protocol architecture for a duplicated-data transmission mode.

With reference to FIG. 2, the following will simply illustrate a method for transmitting duplicated data in the DC scenario and a method for transmitting duplicated data in the CA scenario according to an implementation of the present disclosure.

In the DC scenario, multiple network nodes (cell group, CG) can serve the terminal device. Duplicated data can be transmitted between the CG and the terminal device. It is to be understood that in the implementation of the present disclosure, the CG may be equivalent to a network node or a network device.

In an implementation, in the DC scenario, a protocol architecture for a duplicated-data transmission mode may be illustrated as a data radio bearer (DRB) 2 in FIG. 2. The duplicated-data transmission mode adopts a split-bearer protocol architecture. For uplink and downlink, the PDCP is in a CG (master CG (MCG) or secondary CG (SCG)). The PDCP duplicates a PDCP PDU to obtain two identical copies, for example the PDCP PDU and a duplicated PDCP PDU. The two PDCP PDUs go through radio link control (RLC) layers and medium access control (MAC) layers of different CGs, and then go through an air interface and reach a corresponding MAC layer and RLC layer of a terminal device (downlink) or a base station (uplink), and finally converge at a PDCP layer. In case that the PDCP layer determines that the two PDCP PDUs are identical, the PDCP layer discards one PDCP PDU, and submits the other PDCP PDU to a high layer.

In an implementation of the present disclosure, under the PDCP two bearers connected to the RLC and MAC are referred to as a split bearer. If the PDCP is in the MCG, it is an MCG split bearer, and if the PDCP is in the SCG, it is an SCG split bearer.

In the implementation of the present disclosure, the two PDCP PDUs are transmitted via different CGs, which can achieve a purpose of frequency diversity gain, thereby improving a reliability of data transmission.

It is to be understood that for a bearer configured with a duplicated-data transmission function (also referred to as a DRB), the duplicated-data transmission function of the bearer can be dynamically activated or de-activated via an MAC control element (CE). In the DC scenario, both the MCG and the SCG can transmit the MAC CE to activate or de-activate a duplicated-data transmission function of a split bearer of the terminal device, or only the MCG or the SCG transmits the MAC CE.

In addition, for a split bearer, a path that can be used by the UL can be configured via radio resource control (RRC). For example, the terminal device can choose whether to transmit data via the MCG or the SCG according to RRC configuration.

In the CA scenario, a protocol architecture for a duplicated-data transmission mode may be illustrated as DRB 1 or DRB3 in FIG. 2. The duplicated-data transmission mode adopts a protocol architecture of CA. For example, data (a PDU and duplicated data of the PDU) generated by the PDCP layer are respectively transmitted to two different RLC entities. The two different RLC entities are mapped to different physical-layer carriers via a same MAC entity. It can be understood that in the implementation of the present disclosure, the data (PDU and the duplicated data of the PDU) generated by the PDCP layer are respectively mapped to different physical-layer carriers via the two different RLC entities, which can achieve the purpose of frequency diversity gain, thereby improving the reliability of data transmission.

In order to improve the reliability of data transmission, duplicated data usually needs to be limited to be transmitted on different carriers. For the DC scenario, since different RLC entities correspond to different MAC entities, duplicated PDCP PDUs are inevitably transmitted on different carriers. However, for the CA scenario, different RLC entities correspond to a same MAC entity. In order to ensure that duplicated PDCP PDUs are transmitted on different carriers, configuring a logical channel prioritization (LCP) restriction for a logical channel of an RLC entity is adopted. For example, in logical channel configuration, configure an allowed serving cell (allowedServingCells), and when the duplication-data transmission function is activated, a corresponding data packet can only be transmitted via resources obtained from the allowedServingCells. That is, data on a logical channel can only be transmitted on a corresponding carrier. With the LCP restriction, it can be ensured that duplicated data can be transmitted on different carriers even if different RLC entities for transmitting the duplicated data correspond to one MAC entity.

However, when a PDCP entity of a radio bearer is associated with more RLC entities, for example, 3 or 4 RLC entities, to ensure the reliability of data transmission, different logical channels need to be configured with different carriers. However, the number of carrier sets is limited, which may lead to insufficient available carrier sets. Further, in response to deactivation of the duplicated-data transmission function, how to perform subsequent data transmission, for example, determine that to which RLC entity data is submitted to and on which carrier the data is transmitted to improve the reliability of data transmission, is an urgent problem to be solved.

Figure 3:
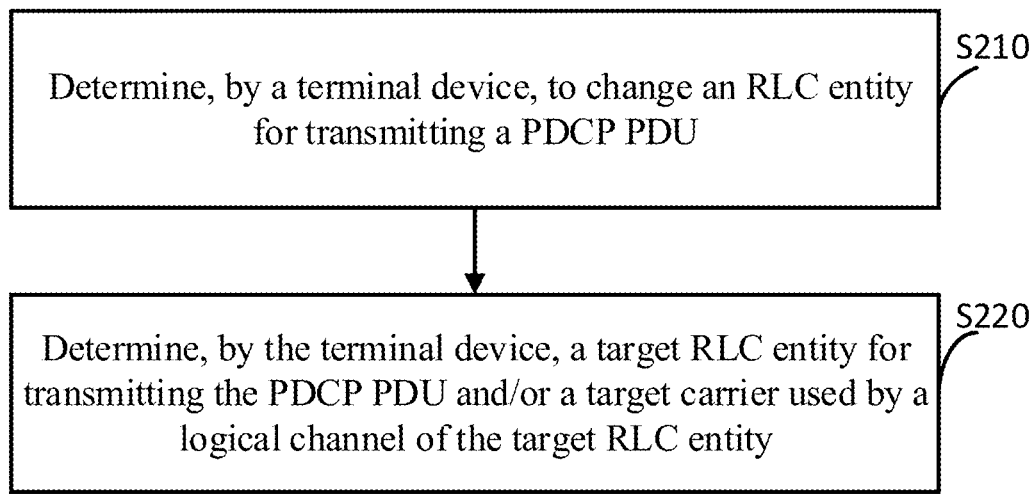
FIG. 3 is a schematic diagram illustrating a method for data transmission according to an implementation of the present disclosure.

FIG. 3 is a schematic flow chart illustrating a method 200 for data transmission according to an implementation of the present disclosure. The method can be executed by the terminal device in the communication system in FIG. 1. As illustrated in FIG. 3, the method 200 includes the following.

At block S210, the terminal device determines to change an RLC entity for transmitting a PDCP PDU.

At block S220, the terminal device determines a target RLC entity for transmitting the PDCP PDU and/or a target carrier used by a logical channel of the target RLC entity.

Figure 4:
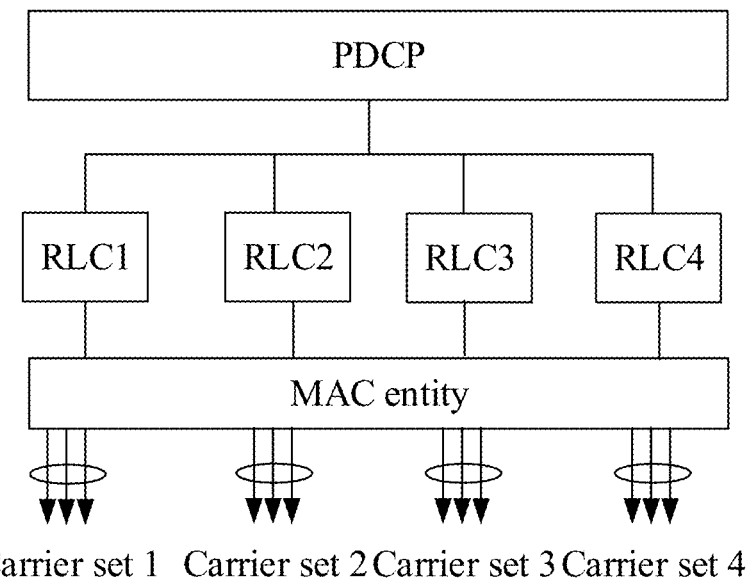
FIG. 4 is a schematic diagram illustrating a data transmission mode in a carrier aggregation (CA) scenario.
Figure 5:
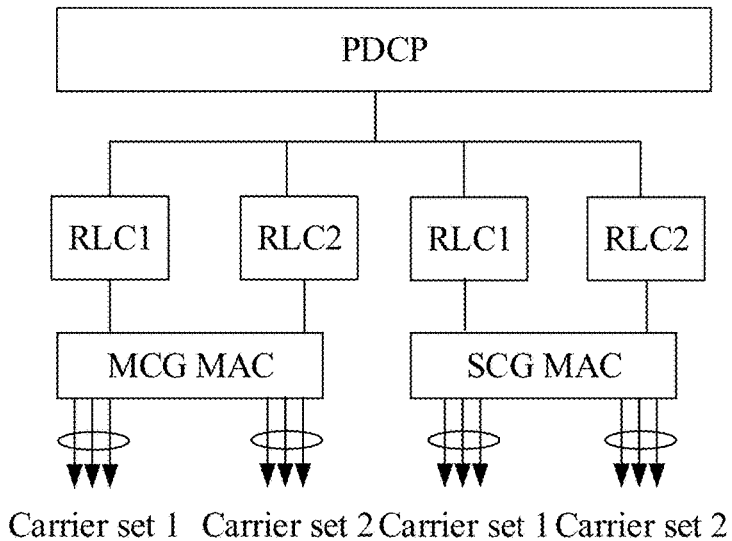
FIG. 5 is a schematic diagram illustrating a data transmission mode in a dual connectivity (DC) scenario.

It is to be understood that in the implementation of the present application, a PDCP entity of a radio bearer is associated with at least two RLC entities. These RLC entities may correspond to a same MAC entity and correspond to a CA scenario. FIG. 4 illustrates an example of the CA scenario. In another implementation, these RLC entities correspond to different MAC entities and correspond to a DC scenario. FIG. 5 illustrates an example of the DC scenario.

In the CA scenario, the PDCP entity of the terminal device can duplicate the PDCP PDU to obtain at least two PDCP PDUs, and then submits the at least two PDCP PDUs to at least two RLC entities. For example, as illustrated in FIG. 4, the PDCP entity can duplicate a PDCP PDU with the sequence number (SN) 1 to obtain two PDCP PDUs, i.e., PDCP PDU 1a and PDCP PDU 1b, and then submits PDCP PDU 1a to RLC entity 1 (hereinafter, called "RLC1") for transmission and submits PDCP PDU 1b to RLC entity 2 (hereinafter, called "RLC2") for transmission.

In an implementation of the present application, the network device can configure logical channels of the at least two RLC entities associated with the PDCP entity with corresponding carrier sets, which corresponds to the allowedServingCell mentioned above, that is, it means that data on a logical channel can only be transmitted on a carrier in a corresponding carrier set. For example, as illustrated in FIG. 4, data on a logical channel of RLC1 can only be transmitted on a carrier in carrier set 1 (CC SET#1), and data on a logical channel of RLC2 can only be transmitted on a carrier in carrier set 2 (CC SET#2), where each carrier set includes one or more carriers.

In an implementation of the present disclosure, carrier sets configured for logical channels of different RLC entities associated with a same PDCP entity may partially overlap or completely overlap, so as to avoid a problem of insufficient carriers under a condition that the number of RLC entities increases.

For example, as illustrated in FIG. 4, carrier set 3 configured for a logical channel of RLC entity 3 (hereinafter, called "RLC3") and carrier set 4 configured for a logical channel of RLC entity 4 (hereinafter, called "RLC4") may be partially or completely the same.

In order to ensure the reliability of data transmission, that is, to ensure that duplicated data can be transmitted on different carriers, in an implementation of the present application, when carrier sets configured for logical channels of two RLC entities are partially or completely the same, the two RLC entities cannot be simultaneously used to transmit duplicated PDCP PDUs. Assuming that the carrier sets configured for the logical channels of RLC3 and RLC4 are partially or completely the same, for an example illustrated in FIG. 4, different combinations of RLC entities for transmitting duplicated data are as follows.

1. If two RLC entities are configured to transmit duplicated data, multiple combinations of RLC entities that can be simultaneously used to transmit the duplicated data are: (RLC1, RLC2), (RLC1, RLC3), (RLC1, RLC4), (RLC2, RLC3), (RLC2, RLC4).

2. If three RLC entities are configured to transmit duplicated data, multiple combinations of RLC entities that can be simultaneously used to transmit the duplicated data are: (RLC1, RLC2, RLC3), (RLC1, RLC2, RLC4).

3. If four RLC entities are configured for transmitting duplicated data, under this condition, there is no RLC entity that can transmit the duplicated data.

What needs to be illustrated is that, in an implementation of the present disclosure, when the activation/deactivation instruction is used for deactivating the duplicated-data transmission function, the activation/deactivation instruction may also be referred to as a deactivation instruction, or when the activation/deactivation instruction is used for activating the duplicated-data transmission function, the activation/deactivation instruction can also be referred to as an activation instruction.

In an implementation of the present disclosure, which RLC entity is used by the terminal device to perform duplicated-data transmission may be configured by the network device. For example, the network device can configure the target RLC entity for transmitting duplicated data via RRC signaling or the activation/deactivation instruction.

For example, as illustrated in FIG. 4, the network device can instruct the terminal device to use RLC1 and RLC2 to transmit duplicated data. In this case, the two RLC entities can be referred to as active RLC entities or RLC entities for transmitting duplicated data. In some implementations, the activation/deactivation instruction may be an MAC CE. As an example and not a limitation, a first byte of the MAC CE may be configured to carry an active-DRB or inactive-DRB identity (ID), and a second byte of the MAC CE may be configured to indicate an active RLC entity, that is, an ID of a logical channel of an RLC entity can be configured to indicate the active RLC entity. In another implementation, the second byte corresponds to a bitmap, where the bitmap may correspond to a logical channel ID or a group of logical channel IDs. The value of each bit in the bitmap can be set to indicate activation or deactivation of a corresponding logical channel, that is, activation or deactivation of an RLC entity corresponding to the logical channel. For example, if the value is 1, it may indicate to activate the RLC entity corresponding to the logical channel, and if the value is 0, it may indicate to deactivate the RLC entity corresponding to the logical channel. In other implementations, other downlink messages or signaling may be used for indication, which is not limited in the implementations of the present application.

In an implementation of the present disclosure, for the CA scenario, when at least two RLC entities are activated to transmit duplicated data, the at least two RLC entities only transmit the duplicated data on carriers in corresponding carrier sets. For example, if RLC1 and RLC2 are used to transmit duplicated data, data on the logical channel of RLC1 is only transmitted on a carrier in carrier set 1, and data on the logical channel of RLC2 is only transmitted on a carrier in carrier set 2, so as to ensure that the duplicated data can be transmitted on different carriers to improve the reliability of data transmission.

In an implementation of the present disclosure, for the DC scenario, when at least two RLC entities are activated to transmit duplicated data, the terminal device can determine which carriers are used to transmit the duplicated data according to whether the at least two RLC entities belong to a same MAC entity. For example, if RLC1 of the MCG MAC and RLC1 of the SCG MAC are used to transmit duplicated data, since the two RLC entities belong to different MAC entities, the two RLC entities correspond to different carriers. In this case, the terminal device may not determine the target carrier according to a configured carrier set. For example, the terminal device can determine the target carrier for transmitting duplicated data from all carriers for the MCG.

In an implementation of the present disclosure, the operation at block S210 includes but is not limited to the following two cases.

Case 1: the terminal device can determine that the RLC entity for transmitting the PDCP PDU needs to be changed in response to reception of the activation/deactivation instruction for the duplicated-data transmission function of the radio bearer from the network device. For example, in response to reception of the deactivation instruction from the network device, the terminal device determines an RLC entity for transmitting non-duplicated data. In response to reception of the activation instruction from the network device, the terminal device determines an RLC entity for transmitting duplicated data.

It is to be understood that, in an implementation of the present disclosure, in response to deactivation of the duplicated-data transmission function of the radio bearer, the PDCP entity stops PDCP PDU duplication, and there may be one or at least two RLC entities that can be used to transmit non-duplicated data. In some implementations, the network device can configure which RLC entities of the terminal device can be used to transmit non-duplicated data. For example, when the network device transmits the deactivation instruction to the terminal device, the network device configures the deactivation instruction to carry information of RLC entities, where the information is used for instructing the PDCP entity of the terminal device to stop PDCP PDU duplication and is indicative of RLC entities for subsequent transmission of non-duplicated data, such as RLC1 and RLC2.

Case 2: the terminal device can determine that the RLC entity for transmitting the duplicated PDCP PDU needs to be changed in response to reception of the activation/deactivation instruction for the duplicated-data transmission function of the radio bear from the network device, that is, the RLC entity for transmitting the duplicated PDCP PDU is changed from at least two RLC entities currently used to at least two other RLC entities to continue duplicated-data transmission. For example, as illustrated in FIG. 4, the network device can configure that the RLC entity for transmitting duplicated data is changed from RLC1 and RLC2 to RLC2 and RLC3. It is to be understood that the RLC entity used before the RLC entity change and the RLC entity used after the RLC entity change may be partially the same or may be completely different.

It is to be understood that in the implementations of the present disclosure subsequent operations after the RLC entity change are illustrated based on the above two cases. If other RLC entity change occurs, reference can be made to the implementations given in the above two cases, which is not limited in the implementations of the present disclosure.

In the following, in combination with the above two cases and the CA and DC scenarios, the subsequent operations after the RLC entity change are illustrated, for example, selection of an RLC entity to which data is submitted, carrier selection, and so on.

Implementation 1: correspond to case 1 and the CA scenario.

In an implementation, the operation at block S220 can include that the terminal device determines a primary RLC entity as the target RLC entity for transmitting the PDCP PDU.

In an implementation, in the CA scenario, multiple RLC entities associated with one PDCP entity correspond to a same MAC entity. In an implementation, in response to deactivation of the duplicated-data transmission function, the PDCP entity of the terminal device can submit the PDCP PDU to the primary RLC entity. In an implementation, the primary RLC entity may be one or more RLC entities among the RLC entities associated with the PDCP entity of the radio bearer, that is, there may be one or more RLC entities for subsequent transmission of non-duplicated data.

It is to be understood that, in an implementation of the present disclosure, the primary RLC entity is a first RLC entity and a second RLC entity. A logical channel of the first RLC entity is configured with a third carrier set, and a logic channel of the second RLC entity is configured with a fourth carrier set. The third carrier set and the fourth carrier set do not overlap or at least partially overlap, that is, the logical channel of the first RLC entity and the logical channel of the second RLC entity can be mapped to a same carrier set or different carrier sets.

Figure 6:
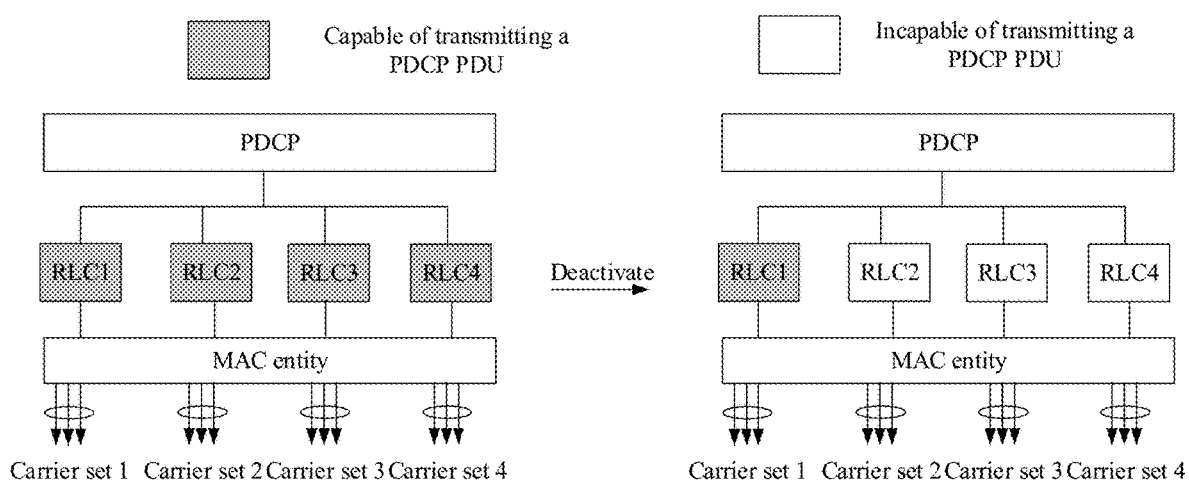
FIG. 6 is a schematic diagram illustrating radio link control (RLC) entity selection and carrier selection according to an implementation of the present disclosure.

For example, as illustrated in FIG. 6, one PDCP entity is associated with four RLC entities. When the duplicated-data transmission function is activated, the four RLC entities can be used to transmit duplicated data, and RLC1 is the primary RLC entity. When the duplicated-data transmission function is deactivated, only RLC1 is used to transmit non-duplicated data.

In an implementation, the primary RLC entity may be configured by the network device. In some implementations, the network device can configure the primary RLC entity via the RRC signaling or the activation/deactivation instruction. For example, the network device can configure the activation/deactivation instruction to carry information of the primary RLC entity. As an example and not a limitation, the network device can configure the second byte of the MAC CE to carry an identity of the primary RLC entity, that is, the LCD. In another implementation, the second byte is a bitmap corresponding to one LCID or a group of LCIDs. The first byte of the MAC CE carries an inactive-DRB ID, as illustrated in Table 1. Of course, the primary RLC entity can also be configured or indicated in other manners. For example, the primary RLC entity can be determined according to agreement. For example, it may be agreed that an RLC entity corresponding to a logical channel with an LCID of 0 is the primary RLC entity, which is not limited in the implementation of the present application.

In an implementation, in response to deactivation of the duplicated-data transmission function of the radio bearer, the PDCP entity of the radio bearer stops PDCP PDU duplication. The PDC entity can further instruct other RLC entity other than the primary RLC entity among the RLC entities associated with the radio bearer to discard the duplicated PDCP PDU, so as to avoid redundant data transmission.

In another implementation, in response to deactivation of the duplicated-data transmission function of the radio bearer, the PDCP entity of the radio bearer can instruct at least one RLC entity to discard a duplicated PDCP PDU. The at least one RLC entity may be configured by the network device, for example, the network device can configure via the RRC signaling an RLC entity that discards duplicated data in response to deactivation of the duplicated-data transmission function.

The following will illustrate carrier selection after deactivation of the duplicated-data transmission in the CA scenario in combination with a detailed implementation.

As an example and not a limitation, in an implementation of the present disclosure, a logical channel of an RLC entity is configured with an available carrier set as follows.

Manner 1: the logical channel is configured with a first carrier set and a second carrier set. The first carrier set is used in a scenario where the duplicated-data transmission function is activated, that is, a scenario where the RLC entity corresponding to the logical channel can be used to transmit duplicated data. The second carrier set is used in a scenario where the duplicated-data transmission function is deactivated, that is, a scenario where the RLC entity correspond-

TABLE 1

| LC ID | | | | | | | | DRB ID | | | | | | | |
|---|---|---|---|---|---|---|---|---|---|---|---|---|---|---|---|
| D15 | D14 | D13 | D12 | D11 | D10 | D9 | D8 | D7 | D6 | D5 | D4 | D3 | D2 | D1 | D0 |

In some implementations, if the RRC signaling is configured to carry information of a primary RLC entity, and the activation/deactivation instruction is configured to carry information of a primary RLC entity, and the primary RLC entity configured via the RRC signaling is different from that configured via the activation/deactivation instruction, primary RLC entity determination is performed according to the activation/deactivation instruction. For example, in case that the primary RLC entity configured via the RRC signaling is RLC2, and the primary RLC entity configured via the activation/deactivation instruction is RLC1, and the terminal device determines RLC1 as the primary RLC entity.

In an implementation, if the activation/deactivation instruction is not configured to carry the information of the primary RLC entity, the terminal device can use the primary RLC entity configured via the RRC signaling to transmit non-duplicated data in response to deactivation of the duplicated-data transmission function, that is, submit the non-duplicated data to the primary RLC entity configured via the RRC signaling.

It is to be understood that, in some implementations, the network device may configure a primary path which indicates a logical channel, where the logical channel corresponds to an RLC entity. In this case, it can be considered that the network device configures the primary RLC entity, that is, the RLC entity corresponding to the primary path is the primary RLC entity.

In an implementation, the method 200 further includes the following. The PDCP entity of the terminal device instructs an RLC entity other than the target RLC entity to discard a duplicated PDCP PDU.

ing to the logical channel is not used to transmit duplicated data. In this way, the terminal device can determine to use which of the available carrier sets according to whether the RLC entity can transmit duplicated data.

Manner 2: the logical channel can be configured with the first carrier set, and the logical channel of the RLC entity is further configured with indication information (for example, 1-bit indication information), and according to the indication information of the logical channel, it can be determined whether the configured first carrier set can be used when the duplicated-data transmission function is deactivated. For example, if the indication information is 1, it means that the first carrier set can be used, and if the indication information is 0, it means that the first carrier set cannot be used. The terminal device can use a carrier in the first carrier set to perform data transmission in case that the indication information indicates that the first carrier set can be used, and use a carrier in the second carrier set to perform data transmission in case that the indication information indicates that the first carrier set cannot be used.

Manner 3: the logical channel can be configured with the first carrier set, and whether to use the first carrier set is determined according to a preset rule. For example, when the duplicated-data transmission function is activated, the logical channel can use the configured first carrier set. When the duplicated-data transmission function is deactivated, another carrier set such as the second carrier set is used for data transmission.

In some implementations, the second carrier set may include all carriers in the first carrier set, and may also include other carriers. In an implementation, the second carrier set may be a union of carrier sets configured for logical channels associated with the radio bearer.

Based on implementation 1, under a condition that the duplicated-data transmission function is deactivated, the PDCP entity of the terminal device can submit the PDCP PDU to the primary RLC entity, and can further instruct a non-primary RLC entity to discard the duplicated PDCP PDU, thereby avoiding redundant data transmission and improving transmission efficiency.

On the other hand, under the condition that the duplicated-data transmission function is deactivated, for transmission of data on the logical channel of the RLC entity of the terminal device, a carrier used for data transmission can be determined from a relatively large carrier set (for example, the second carrier set), that is, the logical channel of the RLC entity can use more carriers to transmit non-duplicated data even if the logical channel is configured with a corresponding carrier set, which can improve data transmission performance.

Implementation 2: correspond to case 1 and the DC scenario.

In implementation 2, the terminal device can determine the target RLC entity in a manner similar to the manner in implementation 1, that is, the primary RLC entity is determined as the target RLC entity, and the PDCP PDU is submitted to the primary RLC entity. For related description, reference can be made to implementation 1, which will not be repeated herein.

In another implementation, the operation at block S220 may include the following. The terminal device determines the target RLC entity according to data volume of the PDCP layer and total data volume of an RLC layer associated with the radio bearer.

In an implementation, for the DC scenario, after deactivation of the duplicated-data transmission function, a transmission mode of the PDCP PDU is changed to the split-bearer mode. The PDCP entity stops PDCP PDU duplication, and then determines an RLC entity to which the PDCP PDU is submitted to according to the data volume of the PDCP layer and the total data volume of the RLC layer associated with the radio bearer.

It is to be understood that in an implementation of the present disclosure, for determining the data volume of the PDCP layer and the data volume of the RLC layer, data volume of all RLC layers associated with the radio bearer can be calculated, or only data volume of an RLC entity that currently transmits non-duplicated data is calculated. It is to be understood that the data volume of the RLC layer may be data volume to be transmitted for the first time.

For example, if a sum of the data volume of the PDCP layer and the total data volume of the RLC layer associated with the radio bear is larger than or equal to a preset threshold, the primary RLC entity or a secondary RLC entity is determined as the target entity. That is, if the sum is relatively large, the PDCP entity of the terminal device can submit the PDCP PDU to the primary RLC entity or the secondary RLC entity. If the sum of the data volume of the PDCP layer and the total data volume of the RLC layer associated with the radio bear is smaller than the preset threshold, the primary RLC entity is determined as the target RLC entity. That is, if the sum is relatively small, the PDCP entity of the terminal device can submit the PDCP PDU only to the primary RLC entity.

In an implementation of the present disclosure, the method further includes receiving second configuration signaling from the network device, where the second configuration signaling is used for configuring the primary RLC entity and the secondary RLC entity.

The network device can configure the primary RLC entity and the secondary RLC entity for the terminal device. It is to be understood that the primary RLC entity and the secondary RLC entity can be configured via same signaling or different signaling, which is not limited in the implementation of the present disclosure.

The second configuration signaling may be the activation/deactivation instruction or the RRC signaling. For example, the network device can configure the MAC CE for deactivating the duplicated-data transmission function to carry information of the primary RLC entity and the secondary RLC entity. As an example and not a limitation, a second byte or a third byte of the MAC CE can be configured to carry the information of the primary RLC entity and the secondary RLC entity.

In an implementation, if the secondary RLC entity is configured via the RRC signaling, and RLC entities associated with the radio bearer are only two RLC entities, i.e., one primary RLC entity and one secondary RLC entity, the network device can configure the secondary RLC entity (i.e., secondary path (secondaryPath)) via PDCP configuration in the RRC signaling, which is as follows:

```
secondaryPath    SEQUENCE {
        cellGroup    CellGroupId    OPTIONAL, -- Need R
    logicalChannel    LogicalChannelIdentity OPTIONAL, -- Need R
}
```

In an implementation, if the secondary RLC entity is configured via the RRC signaling, and the RLC entities associated with the radio bearer are at least three RLC entities, an indication field primaryOrSecondaryRLC is added in configuration of an RLC bearer in the RRC signaling to indicate that an RLC entity corresponding to the RLC bearer is the primary RLC entity or secondary RLC entity, which is illustrated as follows:

primaryOrSecondaryRLC    BOOLEAN OPTIONAL, --Need N

Similar to implementation 1, the PDCP entity of the terminal device can also instruct an RLC entity that is not used to transmit non-duplicated data to discard a duplicated PDCP PDU, thereby avoiding redundant data transmission and improving transmission performance.

The following will illustrate carrier selection after deactivation of duplicated-data transmission in the DC scenario in combination with detailed implementations.

Similar to implementation 1, an available carrier set for a logical channel of an RLC entity can be configured in the foregoing configuration manners. Implementation 2 differs from implementation 1 in that after deactivation of the duplicated-data transmission function, RLC entities that can be used to transmit non-duplicated data can belong to a same MAC entity or different MAC entities, but for non-duplicated data transmission, since it is not necessary to limit the non-duplicated data to be transmitted on different carriers, in order to improve a utilization rate of carriers, the carrier selection can be carried out in a similar manner as in implementation 1. That is, the carrier selection is not carried out according to the configured carrier set, and the target carrier for data transmission is determined from a relatively large carrier set. For example, the target carrier is determined from a union of carrier sets configured for all associated logical channels (that is, the second carrier set described above).

In combination with implementation 2, under a condition that the duplicated-data transmission function is deactivated, the PDCP entity of the terminal device can determine an RLC entity to which the PDCP PDU is submitted to according to total data volume of the PDCP layer and the RLC layer. For example, if the total data volume is relatively large, it is determined to submit the PDCP PDU to the primary RLC entity or the secondary RLC entity, that is, both the primary RLC entity and the secondary RLC entity are used to transmit non-duplicated data. If the total data volume is relatively small, it is determined to submit the PDCP PDU to the primary RLC entity, that is, only the primary RLC entity is used to transmit non-duplicated data. In addition, the PDCP entity can also instruct an RLC entity that is not used to transmit the non-duplicated data to discard a duplicated PDCP PDU, thereby avoiding redundant data transmission and improving transmission efficiency.

On the other hand, under the condition that the duplicated-data transmission function is deactivated, for transmission of data on a logical channel of an RLC entity of the terminal device, a carrier used for data transmission can be determined from a relatively large carrier set (for example, the second carrier set), that is, the logical channel of the RLC entity can use more carriers to transmit non-duplicated data even if the logical channel is configured with a corresponding carrier set, which can improve data transmission performance.

It is to be understood that implementation 2 is equivalent to special processing of implementation 1. Implementation 2 differs from implementation 1 in that RLC entities may belong to different MAC entities. In this case, transmission of data on logical channels of the RLC entities is not restricted by LCP. In addition, when the duplicated-data transmission function is deactivated, it can fall back to a split-bearer operation. In this case, the network device needs to configure the primary RLC entity and the secondary RLC entity, and thus when the total data volume is relatively large, the terminal device can determines an RLC entity for transmitting non-duplicated data.

Implementation 3: correspond to case 2 and the CA scenario.

In implementation 3, the terminal device can receive indication signaling from the network device, where the indication signaling indicates to change an RLC entity for data transmission. The indication signaling may carry an identification of an RLC entity used after the RLC entity change.

It is to be understood that after the RLC entity change, status of the duplicated-data transmission function is actually different. Assuming that the duplicated-data transmission function is active before the RLC entity change, the duplicated-data transmission function is still active after the RLC entity change, and only an RLC entity for transmitting duplicated data is changed (recorded as case 2.1). Assuming that the duplicated-data transmission function is inactive before the RLC entity change, the duplicated-data transmission function is still inactive after the RLC entity change, and only an RLC entity for transmitting non-duplicated data is changed (recorded as case 2.2).

In some implementations, the instruction signaling may be the activation/deactivation instruction, the RRC signaling, or other downlink messages or signaling, that is to say, the network device can configure the activation/deactivation instruction to carry the identification of the RLC entity used after the RLC entity change.

For case 2.1, in an implementation, the operation at block S220 may include that the terminal device determines that the RLC entity used after the RLC entity change is the target RLC entity for transmitting the duplicated PDCP PDU.

Figure 7:
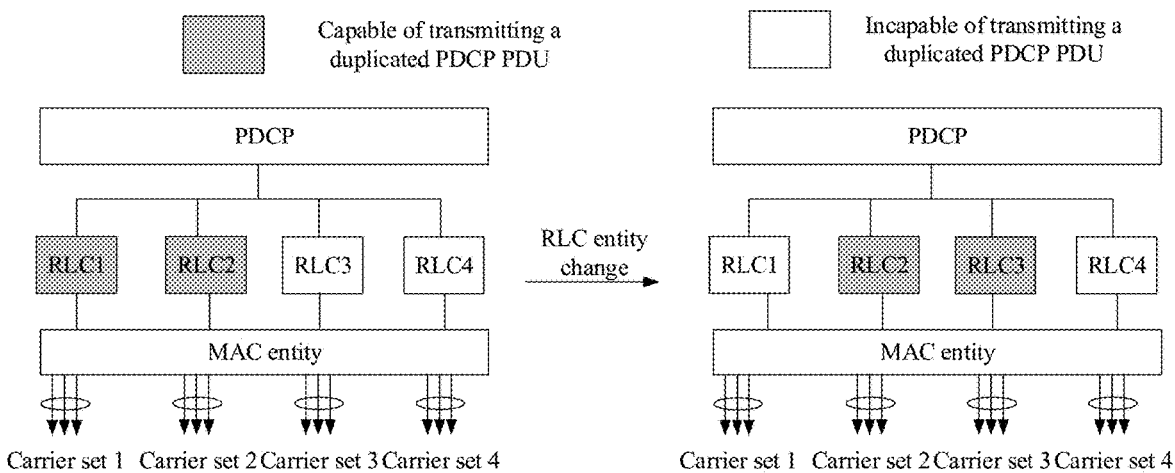
FIG. 7 is a schematic diagram illustrating RLC entity selection and carrier selection according to another implementation of the present disclosure.

For example, as illustrated in FIG. 7, the RLC entity currently used for transmitting duplicated data is RLC1 and RLC2. In response to reception of the indication signaling of RLC entity change from the network device, the terminal device determines that the RLC entity used after the RLC entity change is RLC2 and RLC3, and thus RLC2 and RLC3 can be used to transmit duplicated data. In this situation, it can be considered that the status of the data duplication function of the PDCP keeps unchanged, and only the RLC entity used for subsequent duplicated-data transmission is changed.

Furthermore, the PDCP entity of the terminal device instructs the RLC entity used before the RLC entity change to discard the duplicated PDCP PDU, thereby avoiding redundant data transmission and improving data transmission performance.

After the RLC entity change, the PDCP entity instructs the RLC entity used before the RLC entity change to discard or not discard duplicated data in one of the following implementation manners.

Manner 1: if an RLC entity is no longer used to transmit duplicated data, the PDCP entity can instruct the RLC entity to discard the duplicated PDCP PDU. For example, as illustrated in FIG. 7, the PDCP entity can instruct RLC1 to discard the duplicated PDCP PDU.

Manner 2: if an RLC entity is no longer used to transmit duplicated data, the PDCP entity can instruct the RLC entity to discard the duplicated PDCP PDU. Further, the instructed RLC entity can inform the PDCP entity of the duplicated PDCP PDU discarded. For example, the RLC entity can inform the PDCP entity of an SN of the PDCP PDU discarded. Therefore, the PDCP entity can re-submit the PDCP PDU discarded to the RLC entity used after the RLC entity change for subsequent data transmission.

Figure 8:
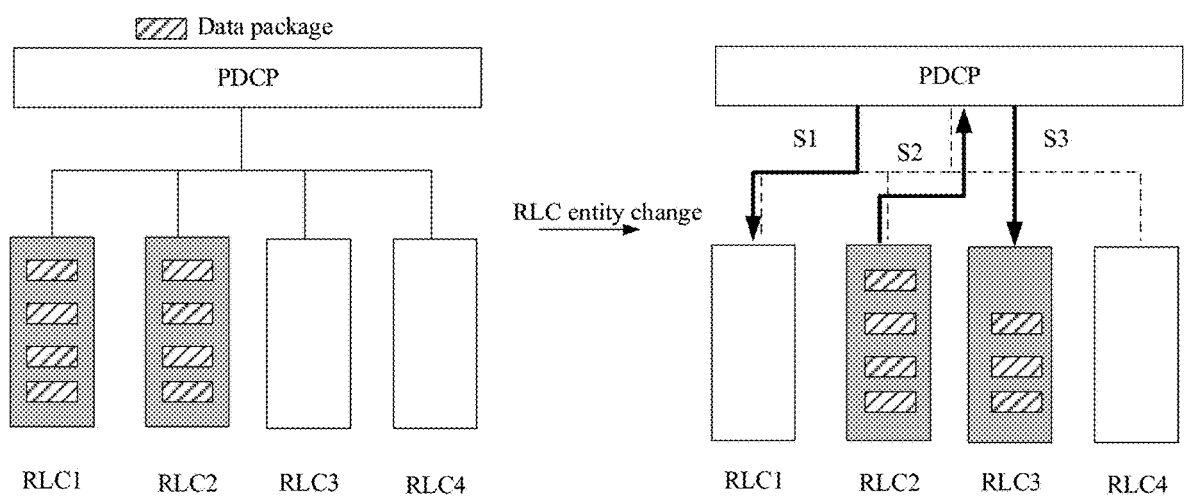
FIG. 8 is a schematic diagram illustrating an implementation manner of discarding duplicated data according to an implementation of the present disclosure.

For example, as illustrated in FIG. 8, the RLC entity used for transmitting duplicated data before the RLC entity change is RLC1 and RLC2, and the RLC entity used after the RLC entity change is RLC2 and RLC3, and accordingly the PDCP entity can determine that RLC1 is no longer used to transmit duplicated data, and in S1 the PDCP entity can instruct RLC1 to discard the duplicated PDCP PDU, and further in S2, RLC1 can reply the PDCP entity with the PDCP PDU discarded, and then in S3 the PDCP entity can submit the PDCP PDU discarded to the RLC entity used after the RLC entity change, i.e., RLC3, so as to ensure reliable data transmission.

Manner 3: if an RLC entity is no longer used to transmit duplicated data, the duplicated PDCP PDU previously transmitted by the RLC entity may not be discarded, and the RLC entity used after the RLC entity change is used for transmitting a duplicated PDCP PDU received from the PDCP entity. For example, as illustrated in FIG. 7, RLC1 may not discard the duplicated PDCP PDU, but the PDCP entity no longer transmits a duplicated PDCP PDU to RLC1.

The following will illustrate carrier selection after the RLC entity change in the CA scenario in combination with detailed implementations.

For case 2.1, since the RLC entity used after the RLC entity is used for transmitting duplicated data, to ensure reliable data transmission, i.e., to ensure duplicated-data transmission on different carriers, for transmission of data on a logical channel of an RLC entity of the terminal device, a target carrier for duplicated-data transmission can be determined from a configured carrier set, that is, the data on the logical channel is only transmitted on a carrier in the carrier set configured for the logical channel.

For case 2.2, since the RLC entity used after the RLC entity change is used for transmitting non-duplicated data, there is no need to limit whether the non-duplicated data is transmitted on different carriers. Therefore, for transmission of data on a logical channel of an RLC entity of the terminal device, the target carrier can be determined from a relatively large carrier set, for example a union of carrier sets configured for all associated logical channels, and thus it can be ensured that more carriers can be used for data transmission, thereby improving efficiency of data transmission.

Based on implementation 3, in case of the RLC entity change, the PDCP entity of the terminal device can submit the PDCP PDU to the RLC entity used after the RLC entity change. For the RLC entity change performed in a condition that the duplicated-data transmission function is activated, the PDCP entity can further instruct the RLC entity used before the RLC entity change to discarded the duplicated PDCP PDU, thereby avoiding redundant data transmission and improving transmission efficiency.

On the other hand, in case of the RLC entity change, for the RLC entity change performed in a condition that the duplicated-data transmission function is deactivated, for transmission of data on a logical channel of an RLC entity of the terminal device, a carrier for data transmission can be determined from a relatively larger carrier set (for example, the second carrier set), that is, the logical channel of the RLC entity can use more carriers to transmit non-duplicated data even if the logical channel is configured with a corresponding carrier set, which can improve data transmission performance. For the RLC entity change performed in a condition that the duplicated-data transmission function is activated, for the data on the logical channel of the RLC entity of the terminal device, duplicated data can only be transmitted on a carrier in the carrier set configured for the logical channel, thereby ensuring reliability of data transmission.

It is to be understood that the RLC entity used after the RLC entity change is a third RLC entity and a fourth RLC entity, a logical channel of the third RLC entity is configured with a third carrier set, and a logical channel of the fourth RLC entity is configured with a fourth carrier set, and the third carrier set and the fourth carrier set do not overlap, so as to ensure that logical channels used for duplicated-data transmission can be mapped to different carrier sets.

Implementation 4: correspond to case 2 and the DC scenario.

It is to be understood that for related processing in the DC scenario such as target RLC entity selection and duplicated-data discarding, reference can be made to description in implementation 3. Since in the DC scenario multiple RLC entities may correspond to different MAC entities, a detailed implementation manner of carrier selection used in implementation 4 is slightly different from that used in implementation 3.

From the above description, it can be determined that if RLC entities for duplicated-data transmission belong to a same MAC entity, carrier sets used for data transmission on logical channels of the RLC entities need to be limited, so as to ensure that duplicated data can be transmitted on different carriers, thereby improving reliability of data transmission. If the RLC entities used for transmitting duplicated data belong to different MAC entities, data on the logical channels of the RLC entities is inevitably transmitted on different carriers, and thus a carrier set configured for a logical channel is not considered.

For case 2.2, in an implementation, the block at S220 may include that the terminal device determines the target carrier according to whether the RLC entity used after the RLC entity change belongs to a same MAC entity.

For example, if the RLC entity used after the RLC entity change belongs to the same MAC entity, the target carrier used by the logical channel of the target RLC entity is determined from a carrier set configured for the logical channel of the RLC entity used after the RLC entity change. If the RLC entity used after the RLC entity belongs to different MAC entities, a target carrier used by the logical channel of the RLC entity used after the RLC entity change is determined from the second carrier set. The second carrier set is different from the carrier set configured for the logical channel of the RLC entity used after the RLC entity change. The second carrier set includes more carriers than the first carrier set. In an implementation, the second carrier set is the union of carrier sets configured for all logical channels.

That is to say, if the RLC entity used after the RLC entity change belongs to the same MAC entity, data on a logical channel of the RLC entity used after the RLC entity change is only transmitted on a carrier in a carrier set configured for the logical channel. If the RLC entity used after the RLC entity change does not belong to the same MAC entity, data on the logical channel of the RLC entity used after the RLC entity change can be transmitted on more carriers, thereby improving transmission performance.

Figure 9:
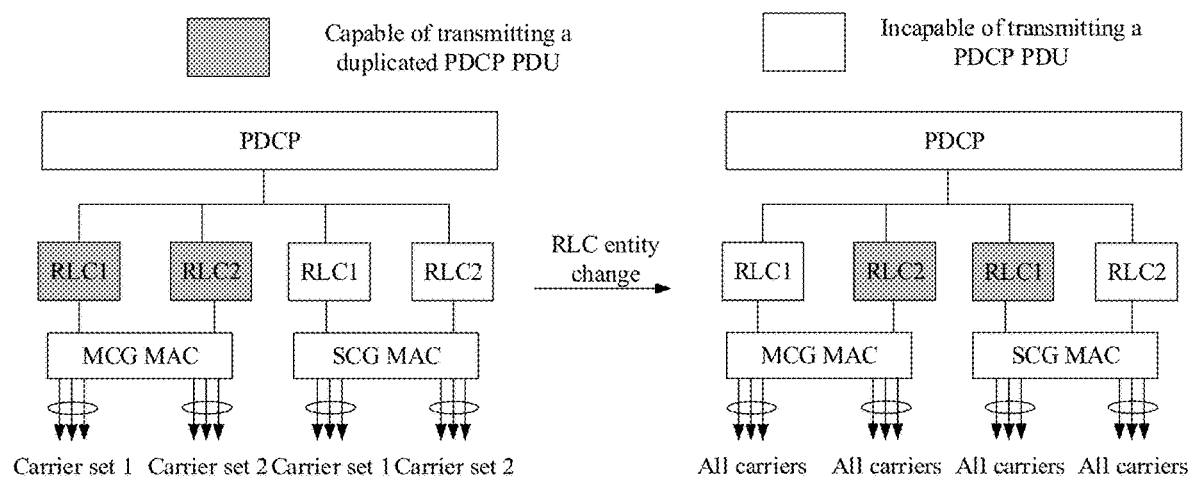
FIG. 9 is a schematic diagram illustrating RLC entity selection and carrier selection according to yet another implementation of the present disclosure.

For example, as illustrated in FIG. 9, RLC entities currently used for transmitting duplicated data are RCL1 and RLC2 of the MCG. In response to reception of the indication signaling of RLC entity change from the network device, the terminal device can determine that RLC entities used after the RLC entity change are RLC2 of the MCG and RLC1 of the SCG, such that RLC2 of the MCG and RLC1 of the SCG can be used to transmit duplicated data. Since RLC2 of the MCG and RLC1 of the SCG belong to different MAC entities, in this case, data on a logical channel of an RLC entity can be transmitted on a carrier in a relatively large carrier set, rather than being limited to be transmitted on a carrier in a carrier set configured for the logical channel. For example, a carrier for data transmission is selected from the union of the carrier sets configured for all the logical channels.

For case 2.1, since the RLC entity used after the RLC entity change is used for transmitting non-duplicated data, data on a logical channel of an RLC entity can be transmitted on a carrier in a relatively large carrier set, rather than being limited to be transmitted on a carrier in a carrier set configured for the logical channel. For example, a carrier for data transmission is selected from the union of the carrier sets configured for all the logical channels.

Based on the above implementations, if one PDCP entity is associated with at least two RLC entities, in implementations of the present disclosure, logical channels of RLC entities associated with a same MAC entity can be mapped to a same carrier set or carrier sets that are partially the same, so as to solve a problem that available carriers are not sufficient in case that the number of RLC entities increase.

In case that the duplicated-data transmission function is deactivated, the PDCP entity of the terminal device can instruct an RLC entity not used for transmitting non-duplicated data to discard a duplicated PDCP PDU, thereby improving transmission efficiency.

If the RLC entity for transmitting duplicated data is changed, which carrier is used for data transmission can be determined according to whether the RLC entity used after the RLC entity change belongs to a same MAC entity. For example, if the RLC entity used after the RLC entity change belongs to a same MAC entity, data on a logical channel of an RLC entity is only transmitted on a carrier in a carrier set configured for the logical channel. If the RLC entity used after the RLC entity change belongs to different MAC entities, for transmission of data on a logical channel of an RLC entity, a carrier for data transmission can be selected from a relatively large carrier set.

In some implementations, the above operations of the terminal device can be applied to the network device. That is, in downlink transmission, the terminal device can perform RLC entity selection or carrier selection according to the above operations of the terminal device, which will not be repeated for simplicity.

The above illustrates the method implementations of the present disclosure in detail in combination with FIGS. 3-9. The following will illustrate device implementations of the present disclosure in combination with FIGS. 10-12. It is to be understood that the device implementations correspond to the method implementations. For similar descriptions, reference can be made to the method implementations.

Figure 10:
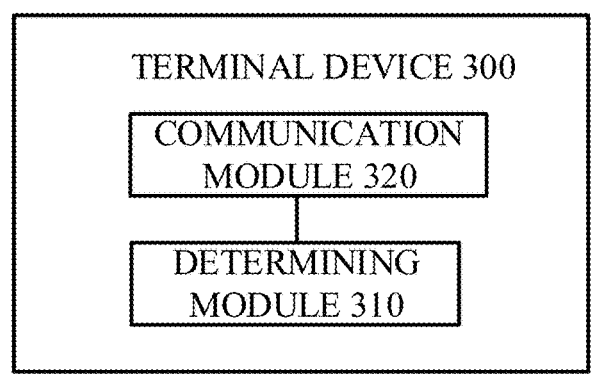
FIG. 10 is a schematic block diagram illustrating a terminal device according to an implementation of the present disclosure.

FIG. 10 is a schematic structural diagram illustrating a terminal device according to an implementation of the present disclosure. As illustrated in FIG. 10, the terminal device 300 includes a determining module 310. The determining module 310 is configured to determine to change an RLC entity for transmitting a PDCP PDU, and determine a target RLC entity for transmitting the PDCP PDU and/or a target carrier used by a logical channel of the target RLC entity.

In some implementations, the terminal device 300 further includes a communication module 320 configured to receive an activation/deactivation instruction from a network device, where the activation/deactivation instruction is used for activating a duplicated-data transmission function of a radio bearer. The determining module 310 is configured to determine to change the RLC entity for transmitting the PDCP PDU, in response to the activation/deactivation instruction.

In some implementations, the determining module 310 is configured to determine a primary RLC entity as the target RLC entity for transmitting the PDCP PDU.

In some implementations, the communication module 320 is further configured to receive first configuration signaling from the network device, where the first configuration signaling is used for configuring the primary RLC entity.

In some implementations, the first configuration signaling is the activation/deactivation instruction or RRC signaling.

In some implementations, the first configuration signaling is the RRC signaling, and the activation/deactivation instruction is configured with a primary path. On condition that the primary path indicated in the activation/deactivation instruction is different from that indicated in the RRC signaling, the terminal device performs a primary-path determination in response to the activation/deactivation instruction.

In some implementations, the determining module 310 is further configured to determine the target RLC entity according to data volume of a PDCP layer and total data volume of an RLC layer associated with the radio bearer.

In some implementations, the determining module 310 is further configured to determine the primary RLC entity or a secondary RLC entity as the target RLC entity, in response to a sum of the data volume of the PDCP layer and the total data volume of the RLC layer associated with the radio bearer being larger than or equal to a preset threshold, or determine the primary RLC entity as the target RLC entity, in response to the sum of the data volume of the PDCP layer and the total data volume of the RLC layer associated with the radio bearer being smaller than the preset threshold.

In some implementations, the communication module 320 is further configured to receive second configuration signaling from the network device, where the second configuration signaling is used for configuring the primary RLC entity and the secondary RLC entity.

In some implementations, the second configuration signaling is the activation/deactivation instruction or RRC signaling.

In some implementations, on condition that the secondary RLC entity is configured via the RRC signaling, and RLC entities associated with the radio bearer are only two RLC entities, the secondary RLC entity is configured via PDCP configuration in the RRC signaling. On condition that the secondary RLC entity is configured via the RRC signaling, and the RLC entities associated with the radio bearer are at least three RLC entities, an indication field is added in configuration of an RLC bearer in the RRC signaling, where the indication field indicates that an RLC entity corresponding to the RLC bearer is the primary RLC entity or the secondary RLC entity.

In some implementations, the communication module 320 is further configured to instruct, on the PDCP layer, an RLC entity other than the target RLC entity to discard a duplicated PDCP PDU.

In some implementations, the determining module 310 is further configured to determine the target carrier from a second carrier set, where the logical channel of the target RLC entity is configured with a first carrier set different from the second carrier set.

In some implementations, the determining module 310 is further configured to determine the target carrier from a second carrier set, where the logical channel of the target RLC entity is configured with the first carrier set and the second carrier set, the first carrier set is used for data transmission in condition of activation of the duplicated-data transmission function, and the second carrier set is used for data transmission in condition of deactivation of the duplicated-data transmission function.

In some implementations, the determining module 310 is configured to determine the target carrier according to logical channel indication information, where the logical channel of the target RLC entity is configured with the first carrier set, and the logical channel indication information indicates whether the first carrier set is capable of being used in condition of deactivation of the duplicated-data transmission function.

In some implementations, the determining module 310 is further configured to determine the target carrier from the first carrier set, in response to the logical channel indication information indicating that the first carrier set is capable of being used in condition of deactivation of the duplicated-data transmission function, and determine the target carrier from the second carrier set, in response to the logical channel indication information indicating that the first carrier set is incapable of being used in condition of deactivation of the duplicated-data transmission function, where the first carrier set is different from the second carrier set.

In some implementations, the second carrier set is a union of carrier sets configured for all logical channels.

In some implementations, the determining module 310 is further configured to determine to change an RLC entity for transmitting a duplicated PDCP PDU.

In some implementations, the determining module 310 is further configured to determine an RLC entity used after RLC entity change as the target RLC entity for transmitting the duplicated PDCP PDU.

In some implementations, the communication module 320 is further configured to submit, on the PDCP layer, the duplicated PDCP PDU to the RLC entity used after the RLC entity change.

In some implementations, the communication module 320 is further configured to instruct, on the PDCP layer, an RLC entity used before the RLC entity change to discard the duplicated PDCP PDU.

In some implementations, the communication module 320 is further configured to receive, on the PDCP layer, an indication information from the RLC entity used before the RLC entity change, where the indication information is indicative of the PDCP PDU discarded. The communication module 320 is further configured to submit, on the PDCP layer, the PDCP PDU discarded to the RLC entity used after the RLC entity change, in response to the indication information.

In some implementations, the determining module 310 is further configured to determine the target carrier according to whether the RLC entity used after the RLC entity change belongs to a same MAC entity.

In some implementations, the determining module 310 is further configured to determine the target carrier used by the logical channel of the target RLC entity from a carrier set configured for a logical channel of the RLC entity used after the RLC entity change, in response to the RLC entity used after the RLC entity change belonging to the same MAC entity, and determine a target carrier used by the logical channel of the RLC entity used after the RLC entity change from the second carrier set, in response to the RLC entity used after the RLC entity change belonging to different MAC entities, where the second carrier set is different from the carrier set configured for the logical channel of the RLC entity used after the RLC entity change.

In some implementations, the second carrier set is the union of carrier sets configured for all logical channels.

In some implementations, the communication module 320 is further configured to receive indication signaling from the network device, where the indication signaling is used for changing an RLC entity for transmitting duplicated data.

In some implementations, the indication signaling carries identification of the RLC entity used after the RLC entity change.

In some implementations, the indication signaling is the activation/deactivation instruction, where the activation/deactivation instruction is used for activating or deactivating the duplicated-data transmission function of the radio bearer.

In some implementations, the target RLC entity is at least two RLC entities. The at least two RLC entities are a first RLC entity and a second RLC entity. A logical channel of the first RLC entity is configured with a third carrier set, and a logical channel of the second RLC entity is configured with a fourth carrier set. The third carrier set and the fourth carrier set do not overlap or at least partially overlap.

In some implementations, the RLC entity used after the RLC entity change is a third RLC entity and a fourth RLC entity. A logical channel of the third RLC entity is configured with a fifth carrier set, and a logical channel of the fourth RLC entity is configured with a sixth carrier set. The fifth carrier set and the sixth carrier set do not overlap.

It is to be understood that the terminal device 300 in the implementation of the present disclosure can correspond to the terminal device referred in the method implementation of the present disclosure. The above or other operations and/or functions of various units of the terminal device 300 are for realizing the corresponding procedure performed by the terminal device referred in the method 200 illustrated in FIG. 2, which will not be repeated for simplicity.

Figure 11:
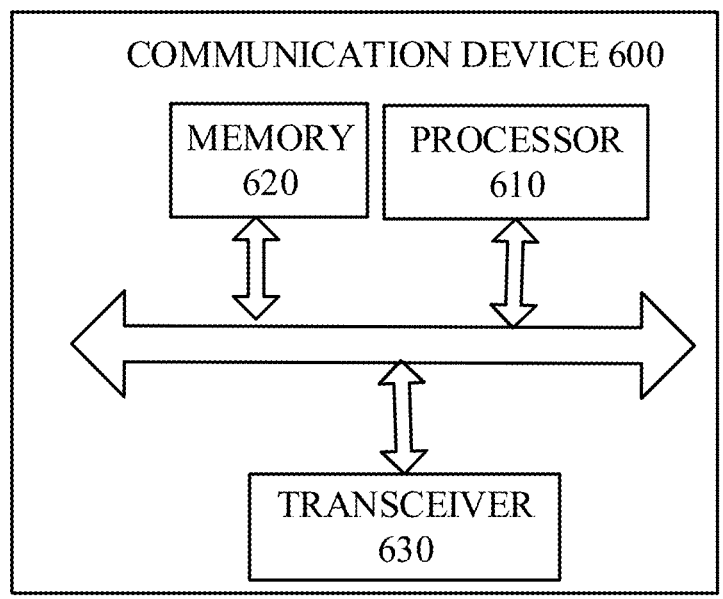
FIG. 11 is a schematic block diagram illustrating a terminal device according to another implementation of the present disclosure.

FIG. 11 is a schematic structural diagram illustrating a communication device 600 according to an implementation of the present disclosure. The communication device 600 illustrated in FIG. 11 includes a processor 610. The processor 610 can invoke and run computer programs in a memory to implement the method in the implementation of the present disclosure.

In an implementation, as illustrated in FIG. 11, the communication device 600 further includes a memory 620. The processor 610 can invoke and run computer programs in the memory 620 to implement the method in the implementation of the present disclosure.

The memory 620 may be a single device independent of the processor 610, and may also be integrated in the processor 610.

In an implementation, as illustrated in FIG. 11, the communication device 600 may further include a transceiver 630. The processor 610 can control the transceiver 630 to communicate with other devices, for example, to transmit information or data to the other devices or receive information or data from the other devices.

In an implementation, the transceiver 630 may include a transmitter and a receiver. The transceiver 630 may further include one or more antennas.

The communication device 600 may be the mobile terminal/terminal device in the implementations of the present disclosure, and the communication device 600 can implement corresponding procedures realized by the mobile terminal/terminal device in the methods in the implementations of the present disclosure, which will not be repeated herein for simplicity.

Figure 12:
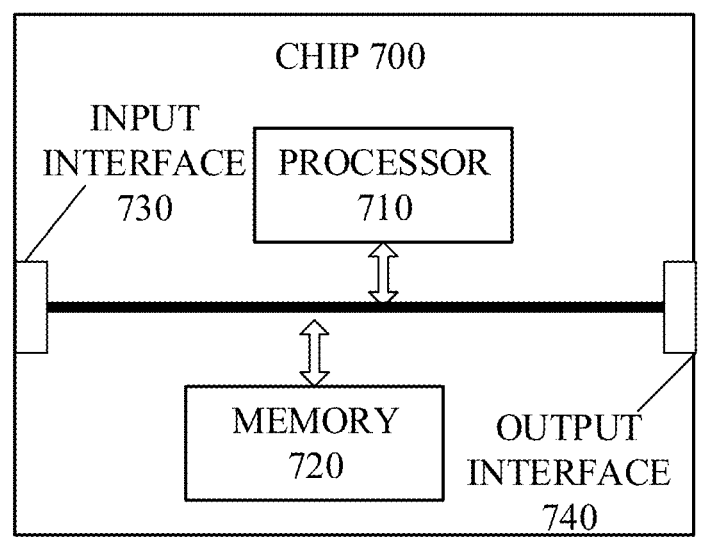
FIG. 12 is a schematic block diagram illustrating a chip according to an implementation of the present disclosure.

FIG. 12 is a schematic structural diagram illustrating a chip according to an implementation of the present disclosure. The chip 700 illustrated in FIG. 12 includes a processor 710. The processor 710 can invoke and run computer programs stored in a memory to implement the methods in the implementation of the present disclosure.

In an implementation, as illustrated in FIG. 12, the chip 700 further includes a memory 720. The processor 710 can invoke and run computer programs stored in the memory 720 to implement the methods in the implementations of the present disclosure.

The memory 720 may be a single device independent of the processor 710, and may also be integrated in the processor 710.

In an implementation, the chip 700 may further include an input interface 730. The processor 710 can control the input interface 730 to communicate with other devices or chips, for example, to receive information or data from the other devices or chips.

In an implementation, the chip 700 may further include an output interface 740. The processor 710 can control the output interface 740 to communicate with other devices or chips, for example, to output information or data to the other devices or chips.

The chip can be applied to the mobile terminal/terminal device in the implementations of the present disclosure, and the chip can implement corresponding procedures realized by the mobile terminal/terminal device in the methods in the implementations of the present disclosure, which will not be repeated herein for simplicity.

It is to be understood that the chip referred in the implementation of the present disclosure may also be referred to as a system-level chip, a system chip, a chip system, a system-on chip, or the like.

It is to be understood that the processor in the implementation of the present disclosure may be an integrated circuit chip with signal processing capability. In the implementation process, the steps of the foregoing method implementations can be completed by hardware integrated logic circuits in the processor or instructions in the form of software. The above-mentioned processor may be a general-purpose processor, a digital signal processor (DSP), an application specific integrated circuit (ASIC), a field programmable gate array (FPGA) or other programming logic devices, discrete gates or transistor logic devices, or discrete hardware components. The methods, steps, and logical block diagrams disclosed in the implementations of the present disclosure can be implemented or executed. The general-purpose processor may be a microprocessor or the processor may also be any conventional processor or the like. The steps of the methods disclosed in the implementations of the present disclosure can be directly executed and completed by a hardware decoding processor, or executed and completed by a combination of hardware and software modules in the decoding processor. The software modules can be located in a mature storage medium in the field such as a random access memory, a flash memory, a read-only memory, a programmable read-only memory, an electrically erasable programmable memory, or a register. The storage medium is located in the memory, and the processor reads information in the memory and completes the steps of the above methods in combination with its hardware.

It can be understood that the memory may be a volatile memory or a non-volatile memory, and may also include both the volatile memory and non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and used for external high-speed cache. By way of examples rather than limitation, various random access memories can be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synclink dynamic random access memory (SLDRAM), and a direct rambus random access memory (DR RAM). It is to be noted that the memory described in this specification is intended to include but is not limited to these and any other suitable types of memories.

It is to be noted that the above memories are exemplary but not used for limitation. For example, the memory in the implementation of the present disclosure may also be an SRAM, a DRAM, an SDRAM, a DDR SDRAM, an ESDRAM, an SLDRAM, and a DR RAM. That is, the memory described in the implementation of the present disclosure is intended to include but is not limited to these and any other suitable types of memories.

Implementations of the present disclosure further provide a computer-readable storage medium configured to store at least one computer program.

In an implementation, the computer-readable storage medium can be applied to the network device in the implementations of the present disclosure, and the computer program enables a computer to execute corresponding procedures realized by the network device in the above methods in the implementations of the present disclosure, which will not be repeated herein for simplicity.

In an implementation, the computer-readable storage medium can be applied to the mobile terminal/terminal device in the implementations of the present disclosure, and the computer program enables the computer to execute corresponding procedures realized by the mobile terminal/terminal device in the above methods in the implementations of the present disclosure, which will not be repeated herein for simplicity.

Implementations of the present disclosure further provide a computer program product which includes computer program instructions.

In an implementation, the computer program product can be applied to the network device in the implementations of the present disclosure, and the computer program instructions enable the computer to execute corresponding procedures realized by the network device in the above methods in the implementations of the present disclosure, which will not be repeated herein for simplicity.

In an implementation, the computer program product can be applied to the mobile terminal/terminal device in the implementations of the present disclosure, and the computer program instructions enable the computer to execute corresponding procedures realized by the mobile terminal/terminal device in the above methods in the implementations of the present disclosure, which will not be repeated herein for simplicity.

Implementations of the present disclosure further provide a computer program.

In an implementation, the computer program can be applied to the network device in the implementations of the present disclosure, and the computer program, when run in the computer, enables the computer to execute corresponding procedures realized by the network device in the above methods in the implementations of the present disclosure, which will not be repeated herein for simplicity.

In an implementation, the computer program can be applied to the mobile terminal/terminal device in the implementations of the present disclosure, and the computer program, when run in the computer, enables the computer to execute corresponding procedures realized by the mobile terminal/terminal device in the above methods in the implementations of the present disclosure, which will not be repeated herein for simplicity.

Those of ordinary skill in the art will appreciate that units and algorithmic operations of various examples described in connection with the implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

According to the several implementations provided in the present disclosure, it will be appreciated that the systems, apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, devices or units, and may be electrical coupling, mechanical coupling, or the like.

Separated units as illustrated may or may not be physically separated. Components or parts displayed as units may or may not be physical units, and may reside at one location or may be distributed to multiple networked units. Some of or all the units may be selectively adopted according to practical needs to achieve objectives of the solutions of the present disclosure.

In addition, the functional units in the various implementations of the present disclosure may be integrated into one processing unit, or each unit may exist alone physically, or two or more units may be integrated into one unit.

If the integrated units are implemented as software functional units and sold or used as standalone products, they may be stored in a computer readable storage medium. Based on such an understanding, the essential technical solution, or the portion that contributes to the relate art, or part of the technical solution of the present disclosure may be embodied as software products. The computer software products can be stored in a storage medium and may include multiple instructions that, when executed, can cause a computing device, e.g., a personal computer, a server, a network device, etc., to execute some of or all operations of the methods described in various implementations of the present disclosure. The above storage medium may include various kinds of media that can store program codes, such as a universal serial bus (USB) flash disk, a mobile hard drive, an ROM, an RAM, an RAM, a magnetic disk, or an optical disk.

The above are only specific implementations of the present disclosure, and the protection scope of the present disclosure is not limited to this. Any person skilled in the art can easily think of changes or substitutions within the technical scope disclosed in the present disclosure, and these changes or substitutions shall fall within the protection scope of the present disclosure. Therefore, the protection scope of the present disclosure shall be subject to the protection scope of the claims.

What is claimed is:

1. A method for data transmission, comprising:
   determining, by a terminal device, to change a radio link control (RLC) entity for transmitting a packet data convergence protocol (PDCP) protocol data unit (PDU), wherein RLC entities associated with a radio bearer comprise at least three RLC entities; and
   determining, by the terminal device, a target RLC entity for transmitting the PDCP PDU and/or a target carrier used by a logical channel of the target RLC entity, comprising:
      determining a primary RLC entity or a secondary RLC entity as the target RLC entity, in response to a sum of a data volume of a PDCP layer and a total data volume of an RLC layer associated with the radio bearer being larger than or equal to a preset threshold;
   wherein the target RLC entity is determined from a primary RLC entity or a secondary RLC entity, the primary RLC entity and the secondary RLC entity are indicated in configuration signaling A received from a network device, wherein the configuration signaling A contains an indication field indicative of which of the at least three RLC entities being the primary RLC entity and which of the at least three RLC entities being the secondary RLC entity, and the primary RLC entity and the secondary RLC entity are used for transmitting non-duplicated data.

2. The method of claim 1, wherein determining, by the terminal device, to change the RLC entity for transmitting the PDCP PDU, comprises:
   receiving, by the terminal device, an activation/deactivation instruction from the network device, wherein the activation/deactivation instruction is used for activating a duplicated-data transmission function of the radio bearer; and
   determining, by the terminal device, to change the RLC entity for transmitting the PDCP PDU, in response to the activation/deactivation instruction.

3. The method of claim 2, further comprising:
   instructing, by a PDCP entity of the terminal device, an RLC entity other than the target RLC entity to discard a duplicated PDCP PDU.

4. The method of claim 1, wherein determining, by the terminal device, to change the RLC entity for transmitting the PDCP PDU, comprises:
   determining, by the terminal device, to change an RLC entity for transmitting a duplicated PDCP PDU.

5. The method of claim 4, wherein determining, by the terminal device, the target RLC entity for transmitting the PDCP PDU and/or the target carrier used by the logical channel of the target RLC entity, further comprises:
   determining, by the terminal device, an RLC entity used after RLC entity change as the target RLC entity for transmitting the duplicated PDCP PDU.

6. The method of claim 4, wherein determining, by the terminal device, the target RLC entity for transmitting the PDCP PDU and/or the target carrier used by the logical channel of the target RLC entity, further comprises:
   determining, by the terminal device, the target carrier according to whether the RLC entity used after the RLC entity change belongs to a same medium access control (MAC) entity.

7. The method of claim 6, wherein determining, by the terminal device, the target carrier according to whether the RLC entity used after the RLC entity change belongs to the same MAC entity, comprises:
   determining, by the terminal device, the target carrier used by the logical channel of the target RLC entity from a carrier set configured for a logical channel of the RLC entity used after the RLC entity change, in response to the RLC entity used after the RLC entity change belonging to the same MAC entity; or
   determining, by the terminal device, a target carrier used by the logical channel of the RLC entity used after the RLC entity change from another carrier set, in response to the RLC entity used after the RLC entity change belonging to different MAC entities, wherein the another carrier set is different from the carrier set configured for the logical channel of the RLC entity used after the RLC entity change.

8. The method of claim 1, wherein the configuration signaling A is the activation/deactivation instruction or RRC signaling.

9. The method of claim 8, wherein on condition that the secondary RLC entity is configured via the RRC signaling, an indication field is added in configuration of an RLC bearer in the RRC signaling, wherein the indication field indicates that an RLC entity corresponding to the RLC bearer is the primary RLC entity or the secondary RLC entity.

10. A terminal device, comprising:

a processor, and a memory storing a computer program which, when executed by the processor, causes the processor to:

determine to change a radio link control (RLC) entity for transmitting a packet data convergence protocol (PDCP) protocol data unit (PDU), wherein RLC entities associated with a radio bearer comprise at least three RLC entities; and determine a target RLC entity for transmitting the PDCP PDU and/or a target carrier used by a logical channel of the target RLC entity, comprising:

determining a primary RLC entity or a secondary RLC entity as the target RLC entity, in response to a sum of a data volume of a PDCP layer and a total data volume of an RLC layer associated with the radio bearer being larger than or equal to a preset threshold;

wherein the target RLC entity is determined from a primary RLC entity or a secondary RLC entity, the primary RLC entity and the secondary RLC entity are indicated in configuration signaling A received from a network device, wherein the configuration signaling A contains an indication field indicative of which of the at least three RLC entities being the primary RLC entity and which of the at least three RLC entities being the secondary RLC entity, and the primary RLC entity and the secondary RLC entity are used for transmitting non-duplicated data.

11. The terminal device of claim 10, further comprising: a transceiver;

wherein the computer program, when executed by the processor, causes the transceiver to receive an activation/deactivation instruction from the network device, wherein the activation/deactivation instruction is used for activating a duplicated-data transmission function of the radio bearer; and the computer program, when executed by the processor, further causes the processor to determine to change the RLC entity for transmitting the PDCP PDU, in response to the activation/deactivation instruction.

12. A non-transitory computer-readable storage medium, the storage medium storing a computer program which, when executed by a processor, causes the processor to:

determine to change a radio link control (RLC) entity for transmitting a packet data convergence protocol (PDCP) protocol data unit (PDU), wherein RLC entities associated with a radio bearer comprise at least three RLC entities; and determine a target RLC entity for transmitting the PDCP PDU and/or a target carrier used by a logical channel of the target RLC entity, comprising:

determining a primary RLC entity or a secondary RLC entity as the target RLC entity, in response to a sum of a data volume of a PDCP layer and a total data volume of an RLC layer associated with the radio bearer being larger than or equal to a preset threshold;

wherein the target RLC entity is determined from a primary RLC entity or a secondary RLC entity, the primary RLC entity and the secondary RLC entity are indicated in configuration signaling A received from a network device, wherein the configuration signaling A contains an indication field indicative of which of the at least three RLC entities being the primary RLC entity and which of the at least three RLC entities being the secondary RLC entity, and the primary RLC entity and the secondary RLC entity are used for transmitting non-duplicated data.

* * * * *